US012556487B2

(12) United States Patent
Gentili

(10) Patent No.: US 12,556,487 B2
(45) Date of Patent: Feb. 17, 2026

(54) METHOD, SYSTEM, AND CIRCUITS FOR RF LOW-LATENCY, MULTIPLE PRIORITY COMMUNICATION

(71) Applicant: STMICROELECTRONICS, INC., Coppell, TX (US)

(72) Inventor: Maurizio Gentili, San Jose, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 553 days.

(21) Appl. No.: 17/542,272

(22) Filed: Dec. 3, 2021

(65) Prior Publication Data

US 2023/0179535 A1    Jun. 8, 2023

(51) Int. Cl.
*H04L 47/62*    (2022.01)
*H04L 47/2408*    (2022.01)
*H04L 47/36*    (2022.01)
*H04L 47/80*    (2022.01)

(52) U.S. Cl.
CPC ........ *H04L 47/622* (2013.01); *H04L 47/2408* (2013.01); *H04L 47/36* (2013.01); *H04L 47/801* (2013.01)

(58) Field of Classification Search
CPC ... H04L 12/417; H04L 47/622; H04L 12/433; H04L 49/9057; H04L 65/70; H04L 69/22; H04L 65/762; H04L 65/60; H04L 69/166; H04L 12/18; H04L 45/245; H04L 47/2408; H04L 47/2475; H04L 47/36;
(Continued)

(56) References Cited

U.S. PATENT DOCUMENTS

| 7,352,770 | B1 | 4/2008 | Yonge, III et al. |
| 7,916,746 | B2 | 3/2011 | Yonge, III et al. |
| 8,396,021 | B2 | 3/2013 | Lum et al. |

(Continued)

FOREIGN PATENT DOCUMENTS

| DE | 102009006907 A1 | 8/2010 |
| WO | WO 0205492 A1 | 1/2002 |

OTHER PUBLICATIONS

Mipi Alliance, "Low Latency Interface (LLI) v2.1," Technology Brief, 2014, 2 pages, <<https://www.mipi.org/sites/default/files/LLI_Spec Brief_2014_FINAL.pdf>>.

(Continued)

*Primary Examiner* — Omer S Mian
(74) *Attorney, Agent, or Firm* — Seed IP Law Group LLP

(57) ABSTRACT

System, method, and circuitry for utilizing a transmit token to create a floating transmission window for multiple priority data in half-duplex communication systems. A first computing device selects audio data and control data to transmit to a second computing device based on a first low priority for audio data relative to a second high priority for control data and on buffer statuses. In response to the first computing device determining that the first computing device possesses a transmit token, the first computing device transmits the selected audio data and the selected control data to the second computing device. The first computing device then transmits the transmit token to the second computing device. The first computing device then waits for the transmit token to be returned before transmitting more data to the second computing device.

23 Claims, 5 Drawing Sheets

(58) Field of Classification Search
CPC ... H04L 47/801; H04L 47/805; H04L 47/806; H04L 49/60; H04L 65/80
USPC .......................................................... 370/429
See application file for complete search history.

(56) References Cited

U.S. PATENT DOCUMENTS

| | | |
|---|---|---|
| 9,233,300 B2 | 1/2016 | Peng et al. |
| 2002/0118671 A1* | 8/2002 | Staples ................. H04L 67/563 370/352 |
| 2006/0084504 A1 | 4/2006 | Chan et al. |
| 2009/0080456 A1* | 3/2009 | Hillyard ................ H04L 1/1887 370/450 |
| 2018/0007108 A1* | 1/2018 | Kärkkäinen ........ H04L 49/9057 |
| 2020/0068428 A1 | 2/2020 | Meylan et al. |
| 2021/0160187 A1 | 5/2021 | Mitra et al. |
| 2021/0212153 A1 | 7/2021 | Siomina et al. |
| 2023/0179392 A1 | 6/2023 | Gentili |
| 2023/0269052 A1* | 8/2023 | Dong .................... H04L 1/1614 370/329 |
| 2023/0299889 A1* | 9/2023 | Schelstraete .............. H04L 1/08 370/329 |

OTHER PUBLICATIONS

Mipi Alliance, "New Low Latency Interface Specification Eliminates Memory Chip," Powerpoint, Mobile World Congress, Barcelona, Spain, Feb. 29, 2012, 15 pages.

\* cited by examiner

METHOD, SYSTEM, AND CIRCUITS FOR RF LOW-LATENCY, MULTIPLE PRIORITY COMMUNICATION

BACKGROUND

Technical Field

The present disclosure generally relates to electronic devices of the type often used in embedded applications. More particularly, but not exclusively, the present disclosure relates to transmitting data between such electronic devices.

Description of the Related Art

Many electronic devices utilize a remote control or perform some other types of communications. For example, gaming consoles generally utilize a hand controller to manipulate and control various features and functions of the gaming console. Sometimes these hand controllers communicate with the gaming console via a wired connection. But often hand controllers communicate with the gaming console via a wireless connection. Historically, information, such as button pushes, were sent from the hand controller to the gaming console to control the console. However, newer hand controllers are much more sophisticated and often utilize two-way communications with the gaming console. For example, the gaming console may transmit game audio and haptic interface commands to the hand controller. The hand controller can in turn output the game audio through a speaker on the hand controller or through headphones that are connected to the hand controller. The hand controller can transmit user-input commands and user audio captured by a microphone connected to the hand controller to the gaming console. This bi-directional transmission, however, can be difficult due to the types of data being transmitted and delays that can occur during transmission. It is with respect to these and other considerations that the embodiments described herein have been made.

BRIEF SUMMARY

Embodiments described herein utilize a transmit token to enable electronic devices to transmit different priority data of different types to one another. For example, a first computing device includes first circuitry, a first audio buffer, and a first control buffer and a second computing device includes second circuitry, a second audio buffer, and a second control buffer.

The first circuitry may be configured to store first audio data in the first audio buffer and store first control data in the first control buffer. The first audio data and the first control data are data that are to be transmitted to the second computing device. The first circuitry may select a portion of the first audio data to transmit based on a first priority for audio data relative to a second priority for control data and on a first audio buffer status of the first audio buffer. Moreover, the first circuitry may select a portion of the first control data to transmit based on the second priority for control data relative to the first priority for audio data and on a first control buffer status of the first control buffer. The second priority of the control data is higher than the first priority of the audio data. In response to determining that the first computing device possesses a transmit token, the first circuitry transmits the selected first audio data and the selected first control data to the second computing device. After the first circuitry has transmitted the selected first audio data and the selected first control data to the second computing device, the first circuitry transmits the transmit token to the second computing device.

The second circuitry may be configured to store second audio data in the second audio buffer and store second control data in the second control buffer. The second audio data and the second control data are data that are to be transmitted to the first computing device. The second circuitry may select a portion of the second audio data to transmit based on the first priority for audio data relative to the second priority for control data and on a second audio buffer status of the second audio buffer. Moreover, the second circuitry may select a portion of the second control data to transmit based on the second priority for control data relative to the first priority for audio data and on a second control buffer status of the second control buffer. In response to receiving the transmit token from the first computing device, the second circuitry may transmit the selected second audio data and the selected second control data to the first computing device. After the second circuitry has transmitted the selected second audio data and the selected second control data to the first computing device, the second circuitry transmits the transmit token back to the first computing device.

Embodiments described herein result in an efficient bi-directional transmission of audio and control data using half-duplex radios, where the control data has a higher priority than the audio data, which can result in faster transmission and less loss of high priority data.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views, unless the context indicates otherwise. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

In the following description, along with the accompanying drawings, certain details are set forth in order to provide a thorough understanding of various embodiments of devices, systems, methods, and articles. One of skill in the art, however, will understand that other embodiments may be practiced without these details. In other instances, well-known structures and methods associated with, for example, circuits, such as transistors, multipliers, adders, dividers, comparators, integrated circuits, logic gates, finite state machines, accelerometers, gyroscopes, memories, bus systems, etc., have not been shown or described in detail in some figures to avoid unnecessarily obscuring descriptions of the embodiments. Moreover, well-known structures or components that are associated with the environment of the present disclosure, including but not limited to the communication systems and networks, have not been shown or described in order to avoid unnecessarily obscuring descriptions of the embodiments.

Unless the context requires otherwise, throughout the specification and claims that follow, the word "comprise" and variations thereof, such as "comprising," and "comprises," are to be construed in an open, inclusive sense, that is, as "including, but not limited to."

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive, and allows for being based on additional features, functions, aspects, or limitations not described, unless the context clearly dictates otherwise. In addition, throughout the specification, the meaning of "a," "an," and "the" include singular and plural references. Furthermore, the particular features, structures, or characteristics may be combined in any suitable manner in one or more embodiments to obtain further embodiments.

Figure 1:
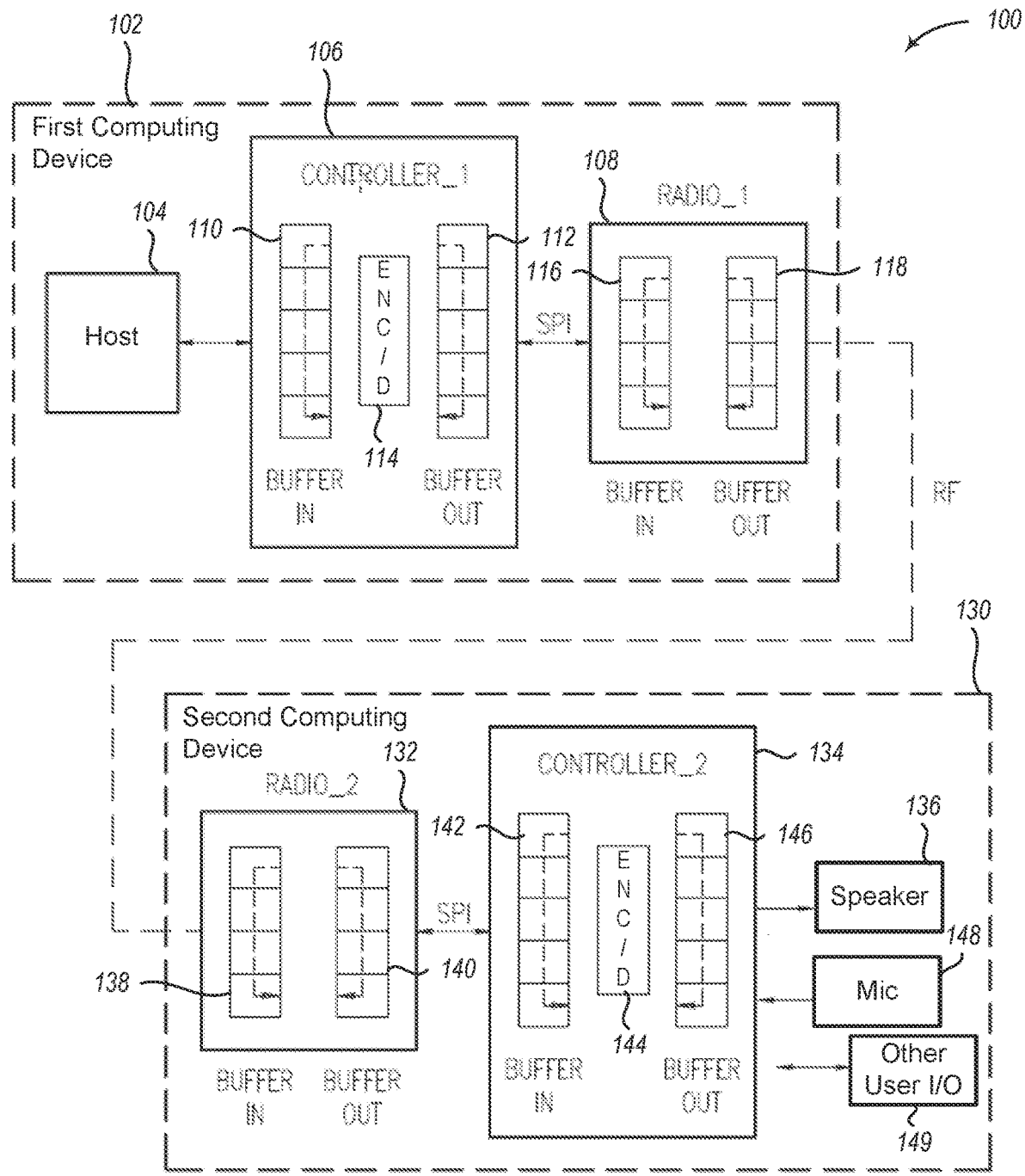
FIG. 1 is a block diagram showing an example computing environment for implementing embodiments described herein.

FIG. 1 is a block diagram showing an example computing environment 100 for implementing embodiments described herein. Environment 100 includes a first computing device 102 and a second computing device 130. The first computing device 102 includes a host 104, a first controller 106, and a first radio 108. The second computing device 130 includes a second radio 132, a second controller 134, a speaker 136, a microphone 148, and other user input/output interface 149. In various embodiments, the radios 108 and 132 are half-duplex radios such that each radio is in a listen mode or transmit mode and only one radio can be transmitting at a time. In various embodiments, the other user input/output interface 149 may include control buttons, haptic interfaces, visual displays, touch screens, or other user interfaces.

The host 104 may be a personal computer, gaming console, or other computing device that is to send and receive audio data and control data to and from the second computing device 130. In some embodiments, the host 104 may be imbedded in or part of the first computing device 102. In other embodiments, the host 104 may be a computing device that is separate from the first computing device 102. Likewise, in some embodiments, one or more of the speaker 136 or the microphone 148 or the other user input/output interface 149 may be imbedded in or part of the second computing device 130. And in other embodiments, one or more of the speaker 136 or the microphone 148 or the other user input/output interface 149 may be separate from the second computing device 130.

The first controller 106 of the first computing device 102 includes multiple inbound buffers 110, multiple outbound buffers 112, and an encoder/decoder 114. The first radio 108 of the first computing device 102 includes multiple inbound buffers 116 and multiple outbound buffers 118. The outbound buffers 112 and 118 include separate buffers for audio data and control data that are to be sent to the second computing device 130, and the inbound buffers 110 and 116 include separate buffers for audio data and control data that are received from the second computing device 130.

The first controller 106 receives, from the host 104, audio data or control data that is to be transmitted to the second computing device 130. The first controller 106 may encode the audio data using the encoder/decoder 114. The control data and encoded audio data (or unencoded data) that is to be transmitted to the second computing device 130 may be referred to as outbound data. The first controller 106 stores the outbound data in at least one buffer of outbound buffers 112. The first controller 106 provides the outbound data to the first radio 108. The first radio 108 stores the outbound data in at least one buffer of the outbound buffer 118 prior to transmission to the second computing device 130.

The transmission of the outbound data is discussed in more detail below. Briefly, the first radio 108 of the first computing device 102 selects audio data or control data based on the priority of the data and transmits the selected outbound data to the second computing device 130 when the first computing device 102 possesses a transmit token. After the selected outbound data is transmitted from the first computing device 102 to the second computing device 130, the first computing device 102 transmits, via first radio 108, the transmit token to the second computing device 130.

The second controller 134 of the second computing device 130 includes multiple inbound buffers 142, multiple outbound buffers 146, and an encoder/decoder 144. The second radio 132 of the second computing device 130 includes multiple inbound buffers 138 and multiple outbound buffers 140. The outbound buffers 146 and 140 include separate buffers for audio data and control data that are received from the first computing device 102 and to be output via speaker 136 or to control other components (not illustrated) or functions of the second computing device 130. The inbound buffers 142 and 138 include separate buffers for audio data and control data that are received via the microphone 148 or input via controls and are to be sent from the second computing device 130 to the first computing device 102.

The second radio 132 of the second computing device 130 receives the transmitted outbound data from the first computing device 102. The second radio 132 stores the outbound data in at least one buffer of outbound buffers 140. The second radio 132 then provides the outbound data to the second controller 134. The second controller 134 stores the outbound data in at least one buffer of outbound buffers 146. The second controller 134 can decode the encoded outbound audio data using the encoder/decoder 144. The second controller 134 may provide the outbound audio data to the speaker 136. The second controller 134 may also utilize or output one or more controls or commands based on the outbound control data to control one or more functions or other components (not illustrated) of the second computing device 130. Examples of such controls may include, for example, haptic interfaces, display interfaces, lights, or other types of output.

The second controller 134 may also receive audio data from the microphone 148 or control data from at least one user input control (not illustrated) that are to be transmitted to the first computing device 102. Examples of the input control may include one or more user input buttons, camera input, or other types of user input devices. The second controller 134 may encode the audio data using the encoder/decoder 144. The control data and encoded audio data (or unencoded data) that is to be transmitted to the first computing device 102 may be referred to as inbound data. The second controller 134 stores the inbound data in at least one buffer of inbound buffers 142. The second controller 134 provides the inbound data to the second radio 132. The second radio 132 stores the inbound data in at least one buffer of the inbound buffer 138 prior to transmission to the first computing device 102.

The transmission of the inbound data is discussed in more detail below. Briefly, the second radio 132 of the second computing device 130 waits to receive a transmit token from the first computing device 102. After it receives the transmit token, the second radio 132 of the second computing device selects inbound data based on the priority of the inbound audio data and inbound control data and transmits the selected inbound data to the first computing device 102. After the selected inbound data is transmitted from the second computing device 130 to the first computing device 102, the second computing device 130 transmits, via second radio 132, the transmit token back to the first computing device 102.

The first radio 108 of the first computing device 102 receives the transmitted inbound data from the second computing device 130. The first radio 108 stores the inbound data in at least one buffer of inbound buffers 116. The first radio 108 then provides the inbound data to the first controller 106. The first controller 106 stores the inbound data in at least one buffer of inbound buffers 110. The first controller 106 can decode the encoded inbound audio data using the encoder/decoder 114. The first controller 106 may provide the inbound audio data or control data to the host 104. The host 104 can then utilize or send the audio data or control data as it is intended.

Although the first controller 106 and the first radio 108 are illustrated as being separate components of the first computing device 102 and the second controller 134 and the second radio 132 are illustrated as being separate components of the second computing device 130, embodiments are not so limited. In some embodiments, the functionality of the first controller 106 and the functionality of the first radio 108 may be performed by a single circuit or component (not illustrated). Similarly, in some embodiments, the functionality of the second controller 134 and the functionality of the second radio 132 may be performed by a single circuit or component (not illustrated).

Moreover, the first controller 106, the first radio 108, the second controller 134, and the second radio 132 may include one or more processors that are configured to execute computer instructions to, independently or collectively, employ embodiments described herein. The first controller 106, the first radio 108, the second controller 134, and the second radio 132 may include or utilize memory of one or more various types of non-volatile and/or volatile storage technologies. Examples of such memory may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. These memories may be used to buffer data or to store computer-readable instructions that are utilized by one or more processors perform actions, including embodiments described herein. Accordingly, the first computing device 102 and the second computing device may include one or more memories that are configured to stores computer instructions that are executable by one or more processors to perform embodiments described herein.

Figure 2A:
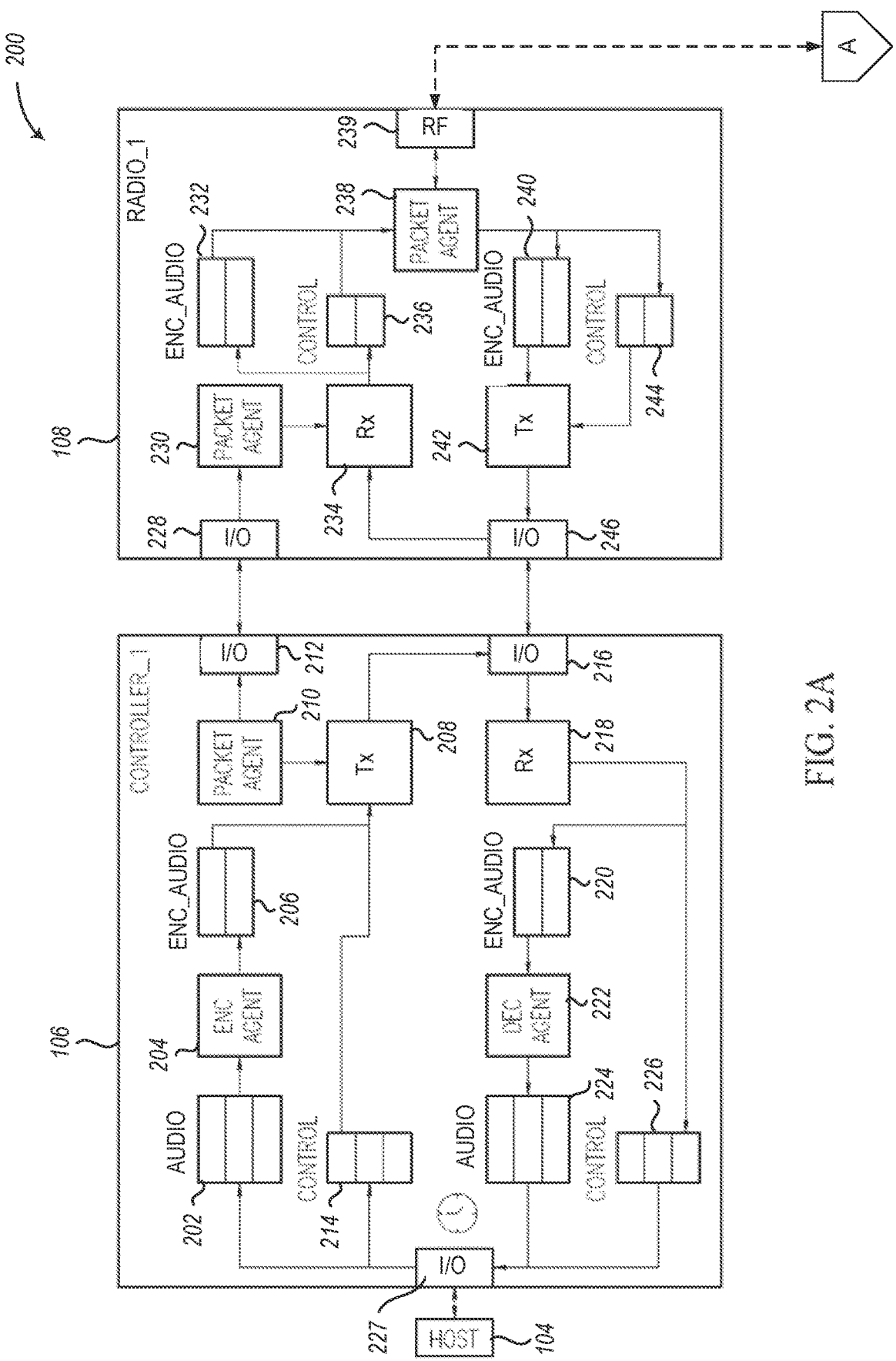
FIGS. 2A and 2B illustrate a block diagram showing an example conceptual structure of circuitry for utilizing a transmit token in accordance with embodiments described herein.
Figure 2B:
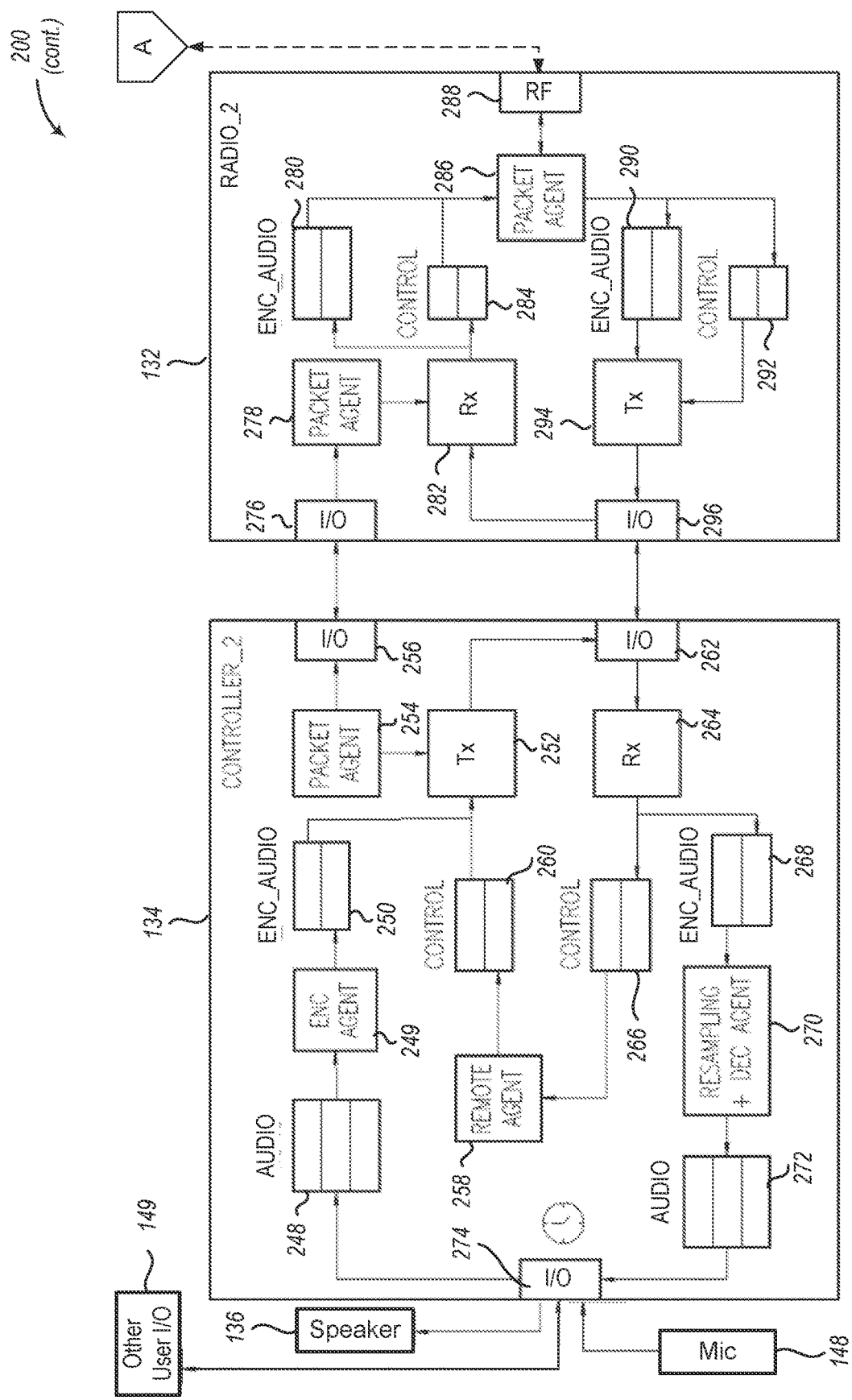

FIGS. 2A and 2B illustrate a block diagram showing an example 200 conceptual structure of circuitry for utilizing a transmit token in accordance with embodiments described herein. Example 200 includes a first controller 106 and a first radio 108, illustrated in FIG. 2A, and a second controller 134 and a second radio 132, illustrated in FIG. 2B, which are similar to the corresponding controllers and radios described above in conjunction with FIG. 1. As indicated above, outbound data is audio data or control data, or both, that is to be transmitted from a first computing device that includes the first controller 106 and the first radio 108 to a second computing device that includes the second controller 134 and the second radio 132. Conversely, inbound data is audio data or control data, or both, that is to be transmitted from the second computing device that includes the second controller 134 and the second radio 132 to the first computing device that includes the first controller 106 and the first radio 108.

The first controller 106, on FIG. 2A, includes a first-controller first-outbound audio buffer 202, a first-controller encoding agent or module 204, a first-controller second-outbound audio buffer 206, a first-controller outbound-control buffer 214, a first-controller outbound transmit module 208, a first-controller packet agent or module 210, a first-controller first-input/output module 212, a first-controller second-input/output module 216, a first-controller inbound receive module 218, a first-controller first-inbound audio buffer 220, a first-controller decoding agent or module 222, a first-controller second-inbound audio buffer 224, a first-controller inbound-control buffer 226, and a first-controller third-input/output module 227. The first-controller first-outbound audio buffer 202, the first-controller second-outbound audio buffer 206, and the first-controller outbound-control buffer 214 may be included in or part of outbound buffers 112 in FIG. 1. And the first-controller first-inbound audio buffer 220, the first-controller second-inbound audio buffer 224, and the first-controller inbound-control buffer 226 may be included in or part of inbound buffers 110 in FIG. 1.

The first radio 108, on FIG. 2A, includes a first-radio first-input/output module 228, a first-radio first-packet agent or module 230, a first-radio outbound receive module 234, a first-radio outbound audio buffer 232, a first-radio outbound control buffer 236, a first-radio second-packet agent or module 238, a first-radio RF module 239, a first-radio inbound audio buffer 240, a first-radio inbound control buffer 244, a first-radio inbound transmit module 242, and a first-radio second-input/output module 246. The first-radio outbound audio buffer 232 first-radio outbound control buffer 236 may be included in or part of outbound buffers 118 in FIG. 1. And the first-radio inbound audio buffer 240 and the first-radio inbound control buffer 244 may be include in or part of inbound buffers 116 in FIG. 1.

The second controller 134, on FIG. 2B, includes a second-controller first-inbound audio buffer 248, a second-controller encoding agent or module 249, a second-controller second-inbound audio buffer 250, a second-controller remote agent or module 258, a second-controller inbound-control buffer 260, a second-controller inbound transmit module 252, a second-controller packet agent or module 254, a second-controller first-input/output module 256, a second-controller second-input/output module 262, a second-controller outbound receive module 264, a second-controller first-outbound audio buffer 268, a second-controller decoding agent or module 270, a second-controller second-outbound audio buffer 272, a second-controller outbound-control buffer 266, and a second-controller third-input/output module 274. The second-controller first-inbound audio buffer 248, the second-controller second-inbound audio buffer 250, and the second-controller inbound-control buffer 260 may be included in or part of inbound buffers 142 in FIG. 1. And the second-controller first-outbound audio buffer 268, the second-controller second-outbound audio buffer 272, and the second-controller outbound-control buffer 266 may be included in or part of outbound buffers 146 in FIG. 1.

The second radio 132, on FIG. 2B, includes a second-radio first-input/output module 276, a second-radio first-packet agent or module 278, a second-radio inbound receive module 282, a second-radio inbound audio buffer 280, a second-radio inbound control buffer 284, a second-radio second-packet agent or module 286, a second-radio RF module 288, a second-radio outbound audio buffer 290, a second-radio outbound control buffer 292, a second-radio outbound transmit module 294, and a second-radio second-input/output module 296. The second-radio inbound audio buffer 280 and the second-radio inbound control buffer 284 may be included in or part of inbound buffers 138 in FIG. 1. And the second-radio outbound audio buffer 290 and the second-radio outbound control buffer 292 may be included in or part of outbound buffers 140 in FIG. 1.

The following is a discussion of the transmission of outbound data from a first computing device (e.g., first computing device 102) to a second computing device (e.g., second computing device 130). Starting with FIG. 2A, the first controller 106 receives outbound audio data or control data, or both, from host 104 via the first-controller input/output module 227. The first controller 106 stores outbound audio data in the first-controller first-outbound audio buffer 202 and stores outbound control data in the first-controller outbound-control buffer 214. In some embodiments, the outbound audio data is stereo audio data for multiple audio output channels. In other embodiments, the outbound audio data is mono-channel audio data. The outbound audio data is encoded via the first-controller encoding module 204 and the encoded outbound audio data is stored in the first-controller second-outbound audio buffer 206. The encoded outbound audio data and the outbound control data are provided from the first-controller second-outbound audio buffer 206 and first-controller outbound-control buffer 214, respectively, to the first-controller outbound transmit module 208. The first-controller outbound transmit module 208 transmits outbound data from the first controller 106 to the first radio 108 via the first-controller second-input/output module 216. The first-controller outbound transmit module 208 may coordinate the transmission of outbound data using the first-controller packet module 210. For example, the first-controller packet module 210 may provide packet information to the first radio 108 via the first-controller first-input/output module 212, which may indicate which data packets or data frames include outbound audio data and which packets or data frames include outbound control data.

The first radio 108 receives the outbound data at the first-radio outbound receive module 234 from the first controller 106 via the first-radio second-input/output module 246. In various embodiments, the first-radio outbound receive module 234 coordinates the receipt of the outbound data with the first-radio first-packet module 230, which can receive packet information from the first controller 106 via the first-radio first-input/output module 228. The first-radio outbound receive module 234 stores the outbound audio data in the first-radio outbound audio buffer 232 and the outbound control data in the first-radio outbound control buffer 236.

The first-radio second-packet module 238 selects which outbound data from the first-radio outbound audio buffer 232 and the first-radio outbound control buffer 236 to transmit to the second radio 132 of the second computing device. In various embodiments, the outbound audio data is given a higher priority than the outbound audio data. The first-radio second-packet module 238 selects which outbound data to transmit to the second radio 132 based on their priorities.

In some embodiments, the first-radio second-packet module 238 may be configured to transmit a pre-selected maximum amount of data during each cycle it has a transmit token, as described herein. The selected data may be all high-priority control data or it may be a pre-selected percentage or ratio of high-priority control data to low-priority audio data. For example, if the first-radio second-packet module 238 can send five data packets, then the first-radio second-packet module 238 may select high-priority control data from the first-radio outbound control buffer 236 to fill four data packets and low-priority audio data from the first-radio outbound audio buffer 232 to fill one data packet. In some embodiments, the amount of data stored in the first-radio outbound audio buffer 232 and the first-radio outbound control buffer 236 may be used to determine the amount of data to select from each buffer—such that data from the fuller buffer is selected first or more data is selected from the fuller buffer compared to the emptier buffer—but selection of the high-priority control data is preferred. Accordingly, a status, such as fullness, delay, or wait times, of the first-radio outbound audio buffer 232 and the first-radio outbound control buffer 236 may also be used to select the outbound audio data and the outbound control data.

As discussed in more detail herein, the first-radio second-packet module 238 may attempt to resend the same selected outbound data to the second radio 132 of the second computing device until it receives an acknowledgement from the second radio 132 that it received the data or until a time-out condition occurs. After the first-radio second-packet module 238 receives the acknowledgement or the time-out condition occurs, the first-radio second-packet module 238 transmits a transmit token to the second radio 132 of the second computing device. In some situations, the first radio 108 may not have sufficient outbound data stored in the first-radio outbound audio buffer 232 or the first-radio outbound control buffer 236 to transmit to the second radio 132. In this situation, the first radio 108 may transmit the transmit token to the second radio 132 after a select amount of time of having an insufficient amount of outbound data to transmit to the second radio 132.

In various embodiments, the first radio 108 may not receive an acknowledgement from the second radio 132 indicating that it successfully received all of the transmitted data, or the first radio 108 may receive an acknowledgement from the second radio 132 indicating which outbound data it received or an amount of outbound data that it received. In some embodiments, the first radio 108 may determine whether or not the second radio 132 successfully received all of the transmitted outbound data based on a comparison between the amount of data the first radio 108 transmitted to the second radio 132 and the amount of received data identified in the acknowledgement. If those amounts are not equal, then the first radio 108 determines that the second radio 132 did not successfully receive all of the transmitted outbound data. In other embodiments, the first radio 108 may determine whether or not the second radio 132 successfully received all of the transmitted outbound data based on a comparison between the data the first radio 108 transmitted to the second radio 132 and the indication in the acknowledgement of the data the second radio 132 received, e.g., comparing packet identifiers. If the acknowledgement from the second radio 132 does not include an identification of outbound data that the first radio 108 transmitted, then the first radio 108 determines that the second radio 132 did not successfully receive all of the transmitted outbound data.

In situations where the first radio 108 determines that the second radio 132 did not successfully receive all of the transmitted outbound data, then the first-radio second-packet module 238 of the first radio 108 may select some (e.g., a subset or the non-successfully transmitted outbound data) or all of the previously transmitted outbound data to retransmit to the second radio 132. In various embodiments, the first radio 108 may attempt to retransmit this selected outbound data a select number of times while the first radio 108 still has the transmit token. In other embodiments, the first radio 108 may attempt to retransmit the selected outbound data the next time the first radio 108 possesses the transmit token, such as when the first radio 108 receives the transmit token back from the second radio 132. In some embodiments, the first radio 108 may preemptively obtain the transmit token if the first radio 108 does not receive the transmit token back from the second radio 132 in a pre-defined amount of time.

Turning to FIG. 2B, the second-radio second-packet module 286 of the second radio 132 receives the transmitted outbound data from the first radio 108 via the second-radio RF module 288. The second-radio second-packet module 286 stores the received outbound audio data in the second-radio outbound audio buffer 290 and the received outbound control data in the second-radio outbound control buffer 292. The second-radio outbound transmit module 294 obtains the outbound data from the second-radio outbound audio buffer 290 and the second-radio outbound control buffer 292 and transmits the outbound data to the second controller 134 via the second-radio second-input/output module 296. In some embodiments, the received outbound data may be stored in a combined audio/control buffer (not illustrated).

After the second radio 132 receives the outbound data from the first radio 108, the second radio 132 transmits an acknowledgement to the first radio 108. As described herein, the acknowledgement may indicate that the second radio 132 successfully received the transmitted outbound data, an amount of data received by the second radio 132, an identity of the outbound data packets received by the second radio 132, etc.

The second-controller outbound receive module 264 of the second controller 134 receives the outbound data from the second radio 132 via the second-controller second-input/output module 262. The second-controller outbound receive module 264 stores the outbound audio data in the second-controller first-outbound audio buffer 268 and stores the outbound control data in the second-controller outbound-control buffer 266. The second-controller remote module 258 obtains the outbound control data from the second-controller outbound-control buffer 266. As discussed herein, the second-controller remote module 258 can output or utilize the received outbound control data to control functionality or controls of the second computing device, such as haptic interfaces, control interfaces, or other user feedback interfaces. The second controller 134 can decode the received outbound audio data stored in the second-controller first-outbound audio buffer 268 using the second-controller decoding module 270. In some embodiments, the second-controller decoding module 270 may also perform resampling mechanisms on the audio data, if needed. The decoded outbound audio data is stored in the second-controller second-outbound audio buffer 272. The second controller can then output the outbound audio data to a speaker 136 via the second-controller third-input/output module 274 for output to a user.

The following is a discussion of the transmission of inbound data from a second computing device (e.g., second computing device 130) to a first computing device (e.g., first computing device 102). Starting with FIG. 2B, the second controller 134 receives inbound audio data from the microphone 148 via the second-controller third-input/output module 274, inbound control data via the second-controller remote module 258, or both. In various embodiments, the second-controller remote module 258 may obtain the inbound control data via one or more user input buttons, joysticks, touch screens, or other user input interfaces. In some other embodiments, other computing devices may also provide some or all of the inbound control data.

The second controller 134 stores inbound audio data in the second-controller first-inbound audio buffer 248 and stores inbound control data in the second-controller inbound-control buffer 260. In some embodiments, the inbound audio data is stereo audio data for multiple audio channels. In other embodiments, the inbound audio data is mono-channel audio data. The inbound audio data is encoded via the second-controller encoding agent or module 249 and the encoded inbound audio data is stored in the second-controller second-inbound audio buffer 250. The encoded inbound audio data and the inbound control data are provided from the second-controller second-inbound audio buffer 250 and the second-controller inbound-control buffer 260, respectively, to the second-controller inbound transmit module 252. The second-controller inbound transmit module 252 transmits inbound data from the second controller 134 to the second radio 132 via the second-controller second-input/output module 262. The second-controller inbound transmit module 252 may coordinate the transmission of inbound data using the second-controller packet module 254. For example, the second-controller packet module 254 may provide packet information to the second radio 132 via the second-controller first-input/output module 256, which may indicate which data packets include inbound audio data and which packets include inbound control data.

The second radio 132 receives the inbound data at the second-radio inbound receive module 282 from the second controller 134 via the second-radio second-input/output module 296. In various embodiments, the second-radio inbound receive module 282 coordinates the receipt of the inbound data with the second-radio first-packet module 278, which can receive packet information from the second controller 134 via the second-radio first-input/output module 276. The second-radio inbound receive module 282 stores the inbound audio data in the second-radio inbound audio buffer 280 and the inbound control data in the second-radio inbound control buffer 284.

The second-radio second-packet module 286 selects which inbound data from the second-radio inbound audio buffer 280 and the second-radio inbound control buffer 284 to transmit to the first radio 108 of the first computing device. Similar to the outbound data discussed above, the inbound control data is given a higher priority than the inbound audio data. The second-radio second-packet module 286 selects which inbound data to transmit to the first radio 108 based on their priorities.

In some embodiments, the second-radio second-packet module 286 may be configured to transmit a pre-selected maximum amount of data during each cycle it has a transmit token, as described herein. The selected inbound data may be all high-priority control data or it may be a pre-selected percentage or ratio of high-priority control data to low-priority audio data. For example, if the second-radio second-packet module 286 can send four data packets, then the second-radio second-packet module 286 may select high-priority control data from the second-radio inbound control buffer 284 to fill three data packets and low-priority audio data from the second-radio inbound audio buffer 280 to fill one data packet. In some embodiments, the amount of data stored in the second-radio inbound audio buffer 280 and the second-radio inbound control buffer 284 may be used to determine the amount of data to select from each buffer—such that data from the fuller buffer is selected first or more data is selected from the fuller buffer compared to the emptier buffer—but selection of the high-priority control data is preferred. Accordingly, a status, such as fullness, delay, or wait times, of the second-radio inbound audio buffer 280 and the second-radio inbound control buffer 284 may also be used to select the inbound audio data and the inbound control data.

Similar to the first-radio second-packet module 238 in FIG. 2A, the second-radio second-packet module 286 may attempt to resend the same selected inbound data to the first radio 108 of the first computing device until it receives an acknowledgement from the first radio 108 that it received the data or until a time-out condition occurs. After the second-radio second-packet module 286 receives the acknowledgement or the time-out condition occurs, the second-radio second-packet module 286 transmits the transmit token back to the first radio 108 of the first computing device. In some situations, the second radio 132 may not have sufficient inbound data stored in the second-radio inbound audio buffer 280 or the second-radio inbound control buffer 284 to transmit to the first radio 108. In this situation, the second radio 132 may transmit the transmit token to the first radio 108 after a select amount of time of having an insufficient amount of inbound data to transmit to the first radio 108.

Moreover, the second radio 132 may not receive an acknowledgement from the first radio 108 indicating that it successfully received all of the transmitted data, or the second radio 132 may receive an acknowledgement from the first radio 108 indicating which inbound data it received or an amount of inbound data that it received. In some embodiments, the second radio 132 may determine whether or not the first radio 108 successfully received all of the transmitted inbound data based on a comparison between the amount of data the second radio 132 transmitted to the first radio 108 and the amount of received data identified in the acknowledgement. If those amounts are not equal, then the second radio 132 determines that the first radio 108 did not successfully receive all of the transmitted inbound data. In other embodiments, the second radio 132 may determine whether or not the first radio 108 successfully received all of the transmitted inbound data based on a comparison between the data the second radio 132 transmitted to the first radio 108 and the indication in the acknowledgement of the data the first radio 108 received, e.g., comparing packet identifiers. If the acknowledgement from the first radio 108 does not include an identification of inbound data that the second radio 132 transmitted, then the second radio 132 determines that the first radio 108 did not successfully receive all of the transmitted inbound data.

In situations where the second radio 132 determines that the first radio 108 did not successfully receive all of the transmitted inbound data, then the second-radio second-packet module 286 of the second radio 132 may select some (e.g., the non-successfully transmitted inbound data) or all of the previously transmitted inbound data to retransmit to the first radio 108. In various embodiments, the second radio 132 may attempt to retransmit this selected inbound data a select number of times while the second radio 132 still has the transmit token. In other embodiments, the second radio 132 may attempt to retransmit the selected inbound data the next time the second radio 132 possesses the transmit token, such as when the second radio 132 receives the transmit token back from the first radio 108. In some embodiments, the second radio 132 may preemptively determine that it does not have the transmit token or lost the transmit token if the second radio 132 does not receive an acknowledgement back from the first radio 108 in a pre-defined amount of time. In this way, the first radio 108 acts as a master maintainer of the transmit token and can assume that it has the transmit token if the first radio 108 has not received the transmit token back from the second radio.

Turning back to FIG. 2A, the first-radio second-packet module 238 of the first radio 108 receives the transmitted inbound data from the second radio 132 via the first-radio RF module 239. The first-radio second-packet module 238 stores the received inbound audio data in the first-radio inbound audio buffer 230 and the received inbound control data in the first-radio inbound control buffer 244. The first-radio inbound transmit module 242 obtains the inbound data from the first-radio inbound audio buffer 240 and the first-radio inbound control buffer 244 and transmits the inbound data to the first controller 106 via the first-radio second-input/output module 246. In some embodiments, the received inbound data may be stored in a combined audio/control buffer (not illustrated).

After the first radio 108 receives the inbound data from the second radio 132, the first radio 108 transmits an acknowledgement to the second radio 132. As described herein, the acknowledgement may indicate that the first radio 108 successfully received the transmitted inbound data, an amount of data received by the first radio 108, an identity of the inbound data packets received by the first radio 108, etc.

The first-controller inbound receive module 218 of the first controller 106 receives the inbound data from the first radio 108 via the first-controller second-input/output module 216. The first-controller inbound receive module 218 stores the inbound audio data in the first-controller first-inbound audio buffer 220 and stores the inbound control data in the first-controller inbound-control buffer 226. The first controller 106 can decode the received inbound audio data stored in the first-controller first-inbound audio buffer 220 using the first-controller decoding module 222. The decoded inbound audio data is stored in the first-controller second-inbound audio buffer 224. The first controller 106 can transmit or provide the inbound data from the first-controller second-inbound audio buffer 224 and the first-controller inbound-control buffer 226 to the host 104 via the first-controller third-input/output module 227.

After the first radio 108 receives the inbound data from the second radio 132, the first radio 108 transmits an acknowledgement to the second radio 132. As described herein, the acknowledgement may indicate that the first radio 108 successfully received the transmitted inbound data, an amount of data received by the first radio 108, an identity of the inbound data packets received by the first radio 108, etc.

As described herein, the transmission of inbound and outbound data between the first computing device and the second computing device is controlled by the transmit token. In various embodiments, the transmit token is a predefined sequence of bits or bytes that indicate the transmitting device is turning over transmission control to the recipient computing device. Moreover, the use of separate audio data buffers and control data buffers avoids or reduces buffering delays for the control data, which allows for priority of transmission to be given to the control data with reduced control data delay or loss. In many situations, a user may not notice a dropped or missing or delayed audio packet. Conversely, delayed control data can greatly affect the user experience. Although embodiments described herein discuss two priority levels, low-priority audio data and high-priority control data, embodiments are not so limited. In some other embodiments, three or more different priorities may be used. In at least one such embodiment, the data for the different priorities are stored in separate buffers and selected for transmission according to their priorities and optionally their buffer statuses (e.g., fullness, wait times, buffer delays, etc.).

Figure 3:
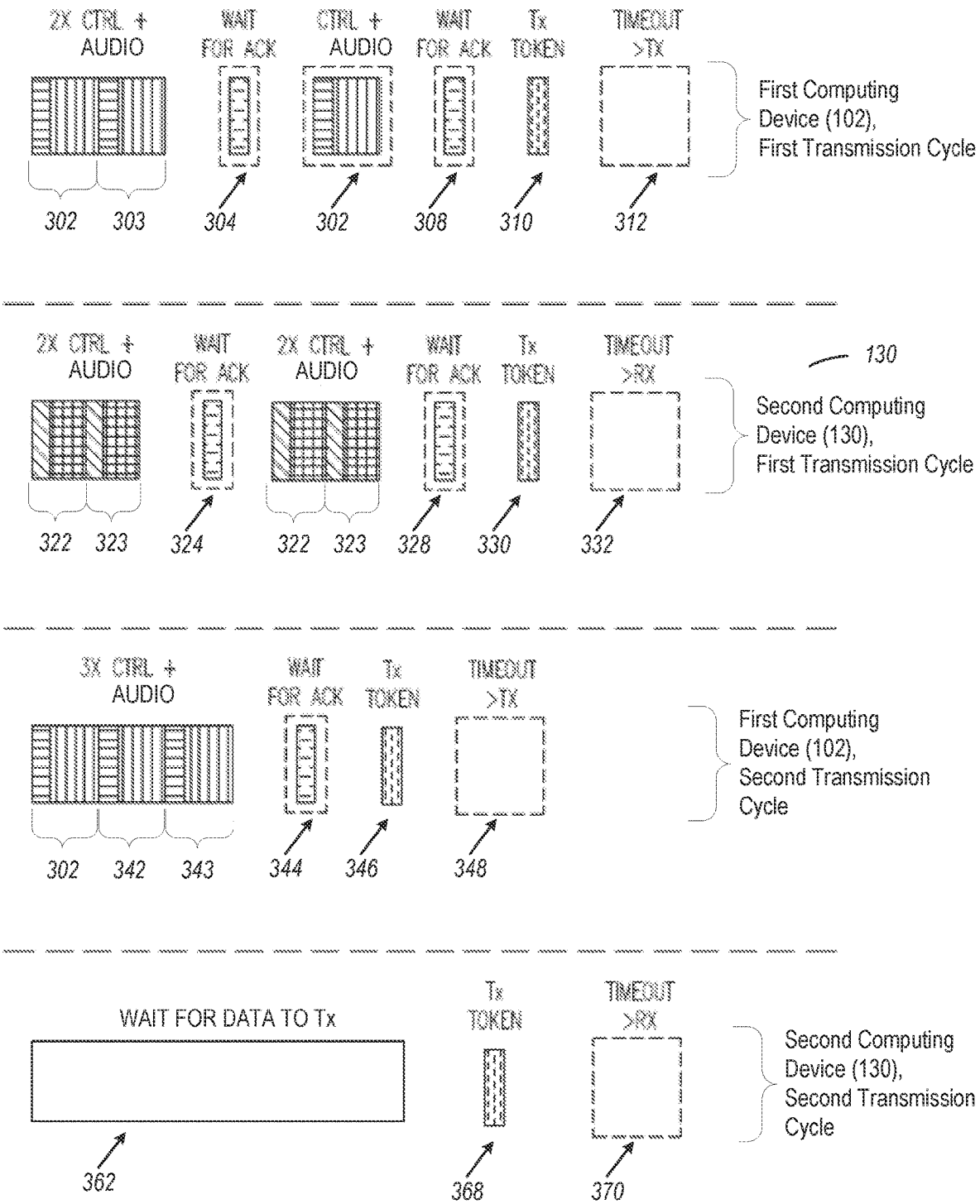
FIG. 3 shows an example transmission sequence between two computing devices in accordance with embodiments described herein.

FIG. 3 shows an example transmission sequence between two computing devices in accordance with embodiments described herein. This example sequence includes four data transmission cycles, two by a first computing device 102 and two by a second computing device 130. In this example sequence during a first data transmission cycle of the first computing device 102, the first computing device 102 has outbound audio data and outbound control data to transmit to the second computing device 130. The first computing device 102 selects and transmits two frames 302-303 of outbound data to the second computing device 130. Each frame (frame 302 and frame 303) includes outbound audio data, outbound control data, or both. In this example, the outbound audio data is shown with vertical line shading and the outbound control data is shown with horizontal line shading. The amount of data in each frame may be predefined or preselected for each computing device.

After transmitting the outbound data frames 302-303 to the second computing device 130, the first computing device 102 waits to receive acknowledgement 304. As mentioned above, the acknowledgement 304 may indicate which packets or data frames the second computing device 130 received. In this example, the acknowledgement 304 indicates that the second computing device 130 received frame 303. Because the first computing device 102 transmitted frames 302 and 303, but did not receive acknowledgement that the second computing device 102 received frame 302, the first computing device 102 can retransmit frame 302.

After the retransmission of frame 302, the first computing device 102 waits for an acknowledgement 308 that the second computing device 130 successfully received frame 302. If the first computing device 102 does not receive the acknowledgement 304 or 308, then the first computing device 102 continues to retransmit the outbound data, or the non-successfully transmitted outbound data, a select number of times, while waiting for an acknowledgement between each retransmission. If the acknowledgement 308, whether alone or in combination with the acknowledgement 304, indicates that all transmitted outbound data was successfully received by the second computing device 130, then the first computing device 102 transmits a transmit token 310 to the second computing device 130. In some embodiments, the use of acknowledgements may be optional and may not be used. Rather the first computing device may transmit the transmit token 310 in response to transmission of frames 302-303.

In various embodiments, the first computing device 102 may enter a wait period 312 after the first computing device 102 transmits the transmit token 310 to the second computing device 130. If the first computing device 102 does not receive the transmit token back from the second computing device 130 or if the first computing device 102 does not receive inbound data from the second computing device 130 during the wait period 312, then the first computing device 102 can assume the transmit token 310 was lost and never received by the second computing device 130. In this situation, the first computing device 102 can preemptively re-capture the transmit token without receiving other information from the second computing device 130. In this way, the first computing device 102 is put into transmit mode and the second computing device 130 is put into receive mode if the first computing device 102 does not receive inbound data or the token from the second computing device 130 after the wait period 312.

In response to the second computing device 130 receiving the transmit token 310, the second computing device 130 begins its first data transmission cycle by selecting and transmitting two frames 322-323 of inbound data to the first computing device 102. Each frame (frame 322 and frame 323) includes inbound audio data, inbound control data, or both. In this example, the inbound audio data is shown with checkered shading and the inbound control data is shown with diagonal line shading.

After transmitting the inbound data frames 322-323 to the first computing device 102, the second computing device 130 waits to receive acknowledgement 324. Similar to what is described above, the second computing device 130 can retransmit inbound data to the first computing device 102 based on the acknowledgement 324, or a lack receiving the acknowledgement 324. In this example, the second computing device 130 does not receive acknowledgement 324. In response, the second computing device 130 retransmits frames 322 and 323 to the first computing device 102.

After the retransmission of frames 322-323, the second computing device 130 waits for an acknowledgement 328 indicating that the first computing device 102 successfully received the retransmitted frames 322-323. If the acknowledgement 328 indicates that all transmitted inbound data was successfully received by the first computing device 102, then the second computing device 130 transmits a transmit token 330 to the first computing device 102.

Similar to the first computing deice 102, the second computing device 130 may enter a wait period 332 after the second computing device 132 transmits the transmit token 330 to the first computing device 102. If the second computing device 130 does not receive the transmit token back from the first computing device 102 or if the second computing device 130 does not receive outbound data from the first computing device 102 during the wait period 332, then the second computing device 130 can assume the transmit token 330 was lost and never received by the first computing device 102. In this situation, the second computing device 130 assumes that the first computing device 102 has re-capture the transmit token without transmitting or receiving other information from the first computing device 102. In this way, the second computing device 130 is put into receive mode and the first computing device 102 is put into transmit mode if the second computing device 130 does not receive outbound data or the token from the first computing device 102 after the wait period 332.

If the first computing device 102 does not receive the acknowledgement 308 during the first transmission cycle, then the first computing device 102 can assume that the second computing device 130 never received the retransmitted frame 302. After the first computing device 102 receives the transmit token 330 from the second computing device 130, then the first computing device 102 can enter its second data transmission cycle and proceed with transmitting additional outbound data to the second computing device 130. In this example, the first computing device 102 retransmits frame 302 along with frames 342-343 to the second computing device 130. If the first computing device 102 receives acknowledgement 344 from the second computing device 130, then the first computing device 102 transmits the transmit token 346 to the second computing device 130. Similar to what is described above, the first computing device 102 can enter a wait period 348 after the transmit token is transmitted to the second computing device 130.

After the second computing device 130 receives the transmit token 346 from the first computing device 102, the second computing device 130 can begin its second transmission cycle and determine if it has additional inbound data to send to the first computing device 102. If there is currently no inbound data available for transmission, then the second computing device 130 can enter a wait period 362 to wait for inbound data to become available. If no inbound data becomes available during the wait period 362, then the second computing device 130 transmits the transmit token 368 to the first computing device 102 without sending any inbound data. After transmission of the transmit token 368, the second computing device 130 enters a wait period 370.

The example transmission sequence shown in FIG. 3 is for illustration purposes and is not to be limiting.

The operation of one or more embodiments will now be described with respect to FIG. 4, and for convenience will be described with respect to the embodiments of the figures described above. In at least one of various embodiments, process 400 described in conjunction with FIG. 4, may be implemented by or executed on one or more computing devices, such as computing devices 102 or 130 in FIG. 1.

Figure 4:
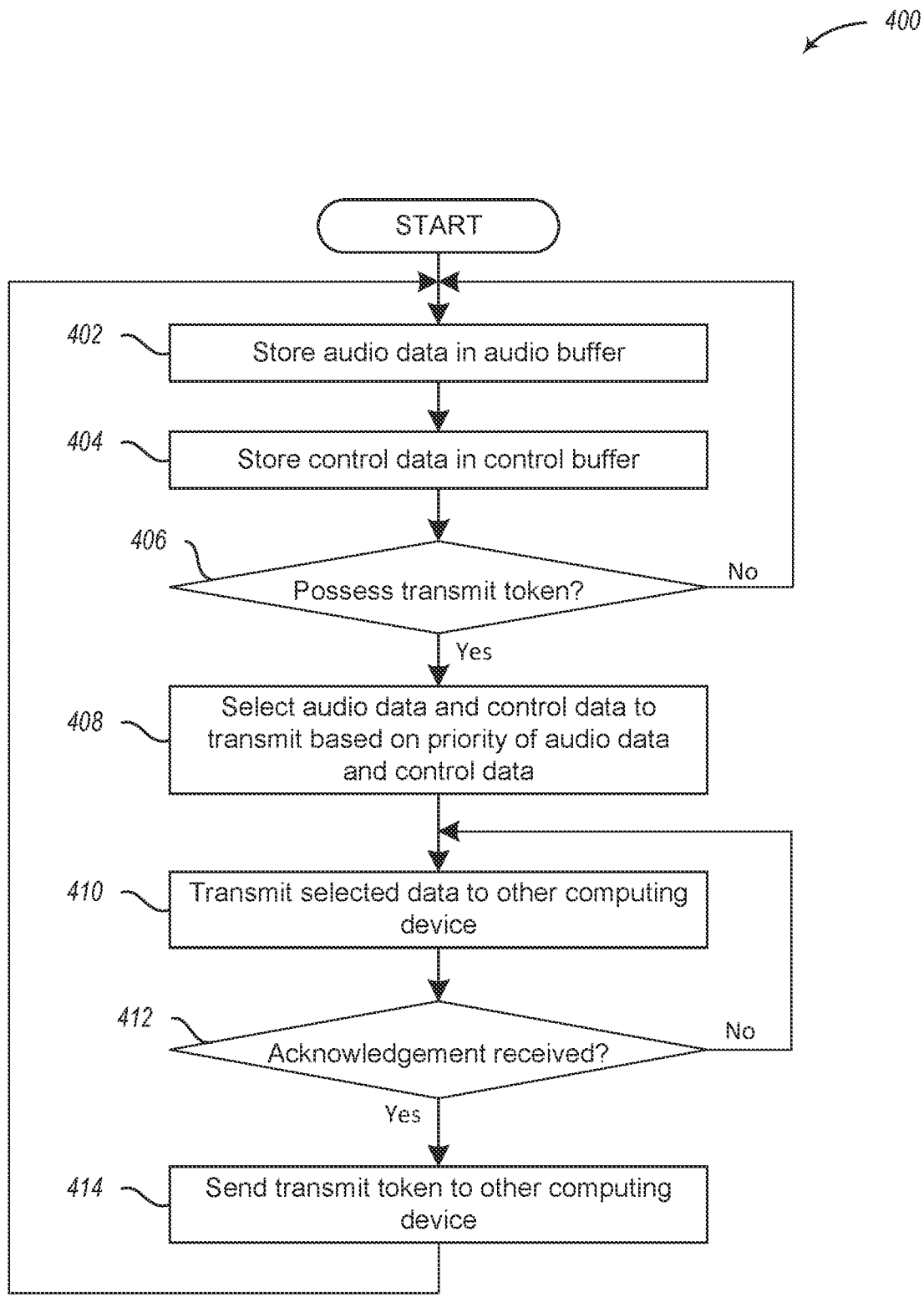
FIG. 4 shows a logical flow diagram of a process for utilizing a transmit token in accordance with embodiments described herein.

FIG. 4 shows a logical flow diagram of a process 400 for utilizing a transmit token in accordance with embodiments described herein. Process 400 begins, after a start block, at block 402, where audio data is stored in an audio buffer. As discussed herein, one or more audio buffers may be used to store the audio data. If the computing device performing process 400 is the first computing device 102, then the stored audio data is outbound audio data. If the computing device performing process 400 is the second computing device 130, then the stored audio data is inbound audio data.

Process 400 proceeds to block 404, where control data is stored in a control buffer. As discussed herein, one or more control buffers may be used to store the control data. If the computing device performing process 400 is the first computing device 102, then the stored control data is outbound control data. If the computing device performing process 400 is the second computing device 130, then the stored computing data is inbound control data.

In some embodiments, block 402 may be optional and may not be performed. For example, in some situations, there may be no audio data to store. In other embodiments, block 404 may be optional and may not be performed. For example, in some situations, there may be no control data to store. In yet other embodiments, storing audio data or control data, or both, may be a background task and may be continuously performed in parallel with the rest of process 400. For example, storage of audio data and control data may be decoupled from the transmission of data and controlled by direct memory access.

Process 400 continues to decision block 406, where a determination is made whether the computing device performing process 400 possesses a transmit token. In some embodiments, the computing device may obtain the transmit token from anther computing device in response to completion of a data transmission cycle, as described herein. In some embodiments, the computing device may determine that it has the transmit token if a wait period has ended without receiving the transmit token from the other device and if the computing device is the first computing device 102 (e.g., the computing device identified as the master device). If the computing device possesses the transmit token, then process 400 flows from decision block 406 to block 408; otherwise, process 400 loops to block 402 to store additional audio and control data.

At block 408, audio data and control data is selected to transmit to another computing device. As described herein, the audio data may be classified as low-priority data and the control data may be classified as high-priority data. Selection of the control data may be given priority over selection of the audio data. Moreover, the buffer status of the audio data and the buffer status of the control data may also be considered when selecting the data. For example, if the audio buffer exceeds a fullness threshold, additional audio data may be selected compared to the audio buffer not exceeding the fullness threshold. Similarly, if the control buffer exceeds a fullness threshold, additional control data may be selected independent of the status of the audio buffer—because the control data has the higher priority.

In some embodiments, the selected audio or control data may include some or all of the previously transmitted data that was not acknowledged as being successfully received by the other computing device.

Process 400 proceeds next to block 410, where the selected data is transmitted to the other computing device. As described herein, this transmission may be a wireless communication using radio frequencies.

Process 400 continues next at decision block 412, where a determination is made whether an acknowledgement is received from the other computing device. As described herein, the acknowledgement may indicate a complete and successful transmission of the selected data, an indication of how much data was received by the other computing device, and identity of the data frames or packets received by the other computing device, or some other indication of the data that was received or not received by the other computing device. If an acknowledgement of a completely successful transmission is received, then process 400 flows to block 414; otherwise, process 400 loops to block 410 to retransmit the selected data to the other computing device. In various embodiments, process 400 may loop a select number of times before determining that data must have been lost and process 400 flows from decision block 412 to block 414.

At block 414, a transmit token is sent or otherwise transmitted to the other computing device. Transmission of the transmit token to the other computing device is a command for the other computing device to enter a transmission mode and for the computing device performing process 400 to enter a receive mode.

After block 414, process 400 loops to block 402 to continue to store audio and control data. In various embodiments, audio data and control data may continue to be stored as process 400 is being performed.

In various embodiments, some blocks described in conjunction with FIG. 4 may be performed in an order other than that which is illustrated. For example, block 404 may be performed before or in parallel with block 402. As another example, the computing device may select audio data and control data to transmit at block 408 prior to the determination of whether the computing device possesses the transmit token at decision block 406.

The following is a summarization of the claims as filed.

A system may be summarized as including: a first computing device having first circuitry, a first audio buffer, and a first control buffer; and a second computing device having second circuitry, a second audio buffer, and a second control buffer. The first circuitry is configured to: store, in the first audio buffer, first audio data to transmit to the second computing device; store, in the first control buffer, first control data to transmit to the second computing device; select a portion of the first audio data to transmit based on a first priority for audio data relative to a second priority for control data and on a first audio buffer status; select a portion of the first control data to transmit based on the second priority for control data relative to the first priority for audio data and on a first control buffer status, wherein the second priority is higher than the first priority; in response to determining that the first computing device possesses a transmit token, transmit the selected first audio data and the selected first control data to the second computing device; and transmit the transmit token to the second computing device after transmitting the selected first audio data and the selected first control data. And the second circuitry is configured to: store, in the second audio buffer, second audio data to transmit to the first computing device; store, in the second control buffer, second control data to transmit to the first computing device; select a portion of the second audio data to transmit based on the first priority for audio data relative to the second priority for control data and on a second audio buffer status; select a portion of the second control data to transmit based on the second priority for control data relative to the first priority for audio data and on a second control buffer status; and in response to receiving the transmit token from the first computing device, transmit the selected second audio data and the selected second control data to the first computing device.

The system may include the first circuitry transmitting the transmit token by being configured to: receive an acknowledge message from the second computing device indicating that the second computing device successfully received the selected first audio data and the selected first control data; and transmit the transmit token to the second computing device in response to receiving the acknowledgement message from the second computing device.

The system may include the first circuitry transmitting the selected first audio data and the selected first control data by being configured to: receive an acknowledge message from the second computing device indicating that the second computing device unsuccessfully received the selected first audio data and the selected first control data; and retransmit the selected first audio data and the selected first control data to the second computing device in response to receiving the acknowledgement message from the second computing device.

The system may include the first circuitry being configured to: receive an acknowledge message from the second computing device indicating that the second computing device unsuccessfully received the selected first audio data and the selected first control data; and in response to receiving the transmit token from the second computing device, retransmit the selected first audio data and the selected first control data to the second computing device in response to receiving the acknowledgement message from the second computing device.

The system may include the first circuitry transmitting the transmit token by being configured to: receive, at the first computing device and from the second computing device, an acknowledge message that indicates a number of frames of data the second computing device received from the first computing device; determining if the number of frames indicated in the acknowledge message is equal to a number of frames sent from the first computing device to the second computing device; in response to determining that the number of frames received by the second computing device equals the number of frames sent by the first computing device, transmitting the transmit token from the first computing device to the second computing device.

The system may include the first circuitry transmitting the transmit token by being configured to: receive, at the first computing device and from the second computing device, an acknowledge message that indicates an amount of data the second computing device received from the first computing device; determining if the amount of data indicated in the acknowledge message is equal to an amount of data sent from the first computing device to the second computing device; in response to determining that the amount of data received by the second computing device equals the amount of data sent by the first computing device, transmitting the transmit token to the second computing device.

A method may be summarized as including: selecting first audio data stored by a first computing device to transmit to a second computing device based on a first priority for audio data relative to a second priority for control data and on a first audio buffer status; selecting first control data stored by the first computing device to transmit to the second computing device based on the second priority for control data relative to the first priority for audio data and on a first control buffer status, wherein the second priority is higher than the first priority; in response to determining that the first computing device possesses a transmit token, transmitting the selected first audio data and the selected first control data to the second computing device; and transmitting the transmit token from the first computing device to the second computing device after the first computing device transmits the selected first audio data and the selected first control data to the second computing device.

The method may include: selecting second audio data stored by the second computing device to transmit to the first computing device based on the first priority for audio data relative to the second priority for control data and on a second audio buffer status; selecting second control data stored by the second computing device to transmit to the first computing device based on the second priority for control data relative to the first priority for audio data and on a second control buffer status; and in response to receiving the transmit token from the first computing device, transmitting the selected second audio data and the selected second control data to the first computing device.

The method may include transmitting the transmit token from the second computing device to the first computing device after the second computing device transmits transmitting the selected second audio data and the selected second control data to the first computing device.

Transmitting the transmit token from the first computing device to the second computing device may include: receiving, at the first computing device, an acknowledge message from the second computing device indicating that the second computing device successfully received the selected first audio data and the selected first control data; and transmitting the transmit token from the first computing device to the second computing device in response to receiving the acknowledgement message from the second computing device.

Transmitting the transmit token from the first computing device to the second computing device may include: receiving, at the first computing device and from the second computing device, an acknowledge message that indicates a number of frames of data the second computing device received from the first computing device; determining if the number of frames indicated in the acknowledge message is equal to a number of frames sent from the first computing device to the second computing device; in response to determining that the number of frames received by the second computing device equals the number of frames sent by the first computing device, transmitting the transmit token from the first computing device to the second computing device.

Transmitting the transmit token from the first computing device to the second computing device may include: receiving, at the first computing device and from the second computing device, an acknowledge message that indicates an amount of audio data and an amount of control data the second computing device received from the first computing device; determining if the amount of audio data and the amount of control data received by the second computing device is equal to an amount of audio data and an amount of control data sent from the first computing device to the second computing device; and in response to determining that the amount of audio data and the amount of control data received by the second computing device is equal to the amount of audio data and the amount of control data sent from the first computing device, transmitting the transmit token from the first computing device to the second computing device.

Transmitting the selected first audio data and the selected first control data to the second computing device may include: receiving, at the first computing device and from the second computing device, an acknowledge message that indicates a number of frames of data the second computing device received from the first computing device; determining if the number of frames indicated in the acknowledge message is equal to a number of frames sent from the first computing device to the second computing device; and in response to determining that the number of frames received by the second computing device is less than the number of frames sent by the first computing device, retransmitting the selected first audio data and the selected first control data from the first computing device to the second computing device prior to transmitting the transmit token from the first computing device to the second computing device.

Transmitting the selected first audio data and the selected first control data to the second computing device may include: receiving, at the first computing device and from the second computing device, an acknowledge message that indicates an amount of data the second computing device received from the first computing device; determining if the amount of data received by the second computing device is equal to an amount of data sent from the first computing device to the second computing device; and in response to determining that the amount of data received by the second computing device is less than the amount of data sent by the first computing device, retransmitting the selected first audio data and the selected first control data from the first computing device to the second computing device prior to transmitting the transmit token from the first computing device to the second computing device.

Transmitting the selected first audio data and the selected first control data to the second computing device may include: receiving, at the first computing device and from the second computing device, an acknowledge message that indicates an amount of audio data and an amount of control data the second computing device received from the first computing device; determining if the amount of audio data and the amount of control data received by the second computing device is equal to an amount of audio data and an amount of control data sent from the first computing device to the second computing device; and in response to determining that the amount of audio data received by the second computing device is less than the amount of audio data sent from the first computing device, retransmitting the selected first audio data from the first computing device to the second computing device prior to transmitting the transmit token from the first computing device to the second computing.

Transmitting the selected first audio data and the selected first control data to the second computing device may include: receiving, at the first computing device and from the second computing device, an acknowledge message that indicates an amount of audio data and an amount of control data the second computing device received from the first computing device; determining if the amount of audio data and the amount of control data received by the second computing device is equal to an amount of audio data and an amount of control data sent from the first computing device to the second computing device; and in response to determining that the amount of control data received by the second computing device is less than the amount of control data sent from the first computing device, retransmitting the selected first control data from the first computing device to the second computing device prior to transmitting the transmit token from the first computing device to the second computing.

The method may include: receiving, at the first computing device and from the second computing device, an acknowledge message that indicates a number of frames of data the second computing device received from the first computing device; determining if the number of frames indicated in the acknowledge message is equal to a number of frames sent from the first computing device to the second computing device; and in response to receiving the transmit token back from the second computing device and in response to determining that the number of frames received by the second computing device is less than the number of frames sent by the first computing device, retransmitting the selected first audio data and the selected first control data from the first computing device to the second computing device.

The method may include: selecting new first audio data stored by the first computing device to transmit to the second computing device based on the first priority for audio data relative to the second priority for control data and on a new first audio buffer status; selecting new first control data stored by the first computing device to transmit to the second computing device based on the second priority for control data relative to the first priority for audio data and on a new first control buffer status; and transmitting the selected new first audio data and the selected new first control data along with the retransmission of the selected first audio data and the selected first control data from the first computing device to the second computing device.

The method may include: receiving, at the first computing device and from the second computing device, an acknowledge message that indicates an amount of data the second computing device received from the first computing device; determining if the amount of data received by the second computing device is equal to an amount of data sent from the first computing device to the second computing device; and in response to receiving the transmit token back from the second computing device and in response to determining that the amount of data received by the second computing device is less than the amount of data sent from the first computing device, retransmitting the selected first audio data and the selected first control data from the first computing device to the second computing device.

Transmitting the selected first audio data and the selected first control data to the second computing device may include: receiving, at the first computing device and from the second computing device, an acknowledge message that indicates an amount of audio data and an amount of control data the second computing device received from the first computing device; determining if the amount of audio data and the amount of control data received by the second computing device is equal to an amount of audio data and an amount of control data sent from the first computing device to the second computing device; and in response to determining that the amount of control data received by the second computing device is less than the amount of control data sent from the first computing device, retransmitting the selected first control data from the first computing device to the second computing device prior to transmitting the transmit token from the first computing device to the second computing.

A non-transitory computer-readable medium having contents that configure a microcontroller to perform a method may be summarized as including: selecting first audio data stored by the microcontroller to transmit to a computing device based on a first priority for audio data relative to a second priority for control data and on a first audio buffer status; selecting first control data stored by the microcontroller to transmit to the computing device based on the second priority for control data relative to the first priority for audio data and on a first control buffer status, wherein the second priority is higher than the first priority; in response to determining that the microcontroller possesses a transmit token, transmitting the selected first audio data and the selected first control data to the computing device; transmitting the transmit token to the computing device after the transmission of the selected first audio data and the selected first control data to the computing device; and waiting for second audio data, second control data, or the transmit token from the computing device.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

The headings and Abstract of the Disclosure provided herein are for convenience only and do not limit or interpret the scope or meaning of the embodiments. And the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A system comprising:
a first computing device having:
  first circuitry;
  a first audio buffer, which, in operation, stores audio data; and
  a first control buffer separate from the first audio buffer, wherein the first control buffer, in operation, stores control data; and
a second computing device having:
  second circuitry;
  a second audio buffer, which, in operation, stores audio data; and
  a second control buffer separate from the second audio buffer, wherein the second control buffer, in operation, stores control data;
wherein the first circuitry is configured to:
  store, in the first audio buffer, first audio data to transmit to the second computing device;
  store, in the first control buffer, first control data to transmit to the second computing device;
  select a portion of the first audio data to transmit based on a first priority for audio data relative to a second priority for control data and on a first audio buffer status;
  select a portion of the first control data to transmit based on the second priority for control data relative to the first priority for audio data and on a first control buffer status, wherein the second priority is higher than the first priority;
  in response to determining that the first computing device possesses a transmit token:
  perform a transmission process, the transmission process including:
    transmitting frames including the selected first audio data and the selected first control data to the second computing device;
    waiting a threshold period of time for an acknowledgement message from the second computing device; and
    in response to the threshold period of time expiring before receipt of an acknowledgement message from the second computing device and a number of retransmissions of the frames in the transmission process being less than a threshold number, repeating the transmitting of the frames and the waiting for an acknowledgement message from the second computing device; and
  transmit the transmit token to the second computing device after completing the transmission process, wherein the first circuitry is configured to store audio data and control data in separate buffers; and
wherein the second circuitry is configured to:
  store, in the second audio buffer, second audio data to transmit to the first computing device;
  store, in the second control buffer, second control data to transmit to the first computing device;

select a portion of the second audio data to transmit based on the first priority for audio data relative to the second priority for control data and on a second audio buffer status;
select a portion of the second control data to transmit based on the second priority for control data relative to the first priority for audio data and on a second control buffer status; and
in response to receiving the transmit token from the first computing device, transmit frames including the selected second audio data and the selected second control data to the first computing device, wherein the second circuitry is configured to store audio data and control data in separate buffers.

2. The system of claim 1, wherein the first circuitry, in operation:
responds to an acknowledge message received during the transmission process from the second computing device indicating that the second computing device successfully received the frames including the selected first audio data and the selected first control data by:
ending the transmission process; and
transmitting the transmit token to the second computing device.

3. The system of claim 1, wherein the first circuitry, in operation:
responds to an acknowledge message received from the second computing device during the transmission process indicating that the second computing device unsuccessfully received the frames including the selected first audio data and the selected first control data by restarting the transmission process.

4. The system of claim 1, wherein the first circuitry, in operation after transmission of the transmit token to the second computing device, responds to an acknowledge message received from the second computing device indicating that the second computing device unsuccessfully received the frames including the selected first audio data and the selected first control data by, in response to receiving the transmit token from the second computing device, restarting the transmission process.

5. The system of claim 1, wherein the first circuitry transmits the transmit token by being configured to:
receive, at the first computing device and from the second computing device, an acknowledge message that indicates a number of frames of data the second computing device received from the first computing device;
determining if the number of frames indicated in the acknowledge message is equal to a number of frames sent from the first computing device to the second computing device;
in response to determining that the number of frames received by the second computing device equals the number of frames sent by the first computing device, transmitting the transmit token from the first computing device to the second computing device.

6. A method, comprising:
selecting first audio data stored by a first computing device in a first audio buffer to transmit to a second computing device based on a first priority for audio data relative to a second priority for control data and on a first audio buffer status;
selecting first control data stored by the first computing device in a first control buffer to transmit to the second computing device based on the second priority for control data relative to the first priority for audio data and on a first control buffer status, wherein the second priority is higher than the first priority, audio data and control data are stored in separate buffers, and the first control buffer is separate from the first audio buffer;
in response to determining that the first computing device possesses a transmit token, performing a transmission process, the transmission process including:
transmitting frames including the selected first audio data and the selected first control data to the second computing device;
waiting a threshold period of time for an acknowledgement message from the second computing device; and
in response to the threshold period of time expiring before receipt of an acknowledgement message from the second computing device and a number of retransmissions of the frames in the transmission process being less than a threshold number, repeating the transmitting of the frames and the waiting for an acknowledgement message from the second computing device; and
transmitting the transmit token from the first computing device to the second computing device after performing the transmission process.

7. The method of claim 6, comprising:
selecting second audio data stored by the second computing device in a second audio buffer to transmit to the first computing device based on the first priority for audio data relative to the second priority for control data and on a second audio buffer status;
selecting second control data stored by the second computing device in a second control buffer to transmit to the first computing device based on the second priority for control data relative to the first priority for audio data and on a second control buffer status, wherein the second control buffer is separate from the second audio buffer; and
in response to receiving the transmit token from the first computing device, transmitting the selected second audio data and the selected second control data to the first computing device.

8. The method of claim 7, comprising:
transmitting the transmit token from the second computing device to the first computing device after the second computing device transmits the selected second audio data and the selected second control data to the first computing device.

9. The method of claim 6, wherein the method comprises:
responding to an acknowledge message received from the second computing device indicating that the second computing device successfully received the frames including the selected first audio data and the selected first control data by:
ending the transmission process; and
transmitting the transmit token to the second computing device.

10. The method of claim 6, wherein transmitting the transmit token from the first computing device to the second computing device comprises:
receiving, at the first computing device and from the second computing device, an acknowledge message that indicates a number of frames of data the second computing device received from the first computing device;
determining if the number of frames indicated in the acknowledge message is equal to a number of frames sent from the first computing device to the second computing device;

in response to determining that the number of frames received by the second computing device equals the number of frames sent by the first computing device, transmitting the transmit token from the first computing device to the second computing device.

11. The method of claim 6, comprising:
receiving, at the first computing device and from the second computing device during the transmission process, an acknowledge message that indicates a number of frames of data the second computing device received from the first computing device;
determining if the number of frames indicated in the acknowledge message is equal to a number of frames sent from the first computing device to the second computing device; and
in response to determining that the number of frames received by the second computing device is less than the number of frames sent by the first computing device, restarting the transmission process.

12. The method of claim 6, comprising:
after transmitting the transmit token to the second computing device, receiving, at the first computing device and from the second computing device, an acknowledge message that indicates a number of frames of data the second computing device received from the first computing device;
determining if the number of frames indicated in the acknowledge message is equal to a number of frames sent from the first computing device to the second computing device; and
in response to receiving the transmit token back from the second computing device and in response to determining that the number of frames received by the second computing device is less than the number of frames sent by the first computing device, restarting the transmission process.

13. The method of claim 12, comprising:
selecting new first audio data stored by the first computing device to transmit to the second computing device based on the first priority for audio data relative to the second priority for control data and on a new first audio buffer status;
selecting new first control data stored by the first computing device to transmit to the second computing device based on the second priority for control data relative to the first priority for audio data and on a new first control buffer status; and
transmitting the selected new first audio data and the selected new first control data along with the retransmission of the selected first audio data and the selected first control data from the first computing device to the second computing device.

14. A non-transitory computer-readable medium having contents that configure a first computing device to perform a method, the method comprising:
selecting first audio data stored by the first computing device in a first audio buffer to transmit to a second computing device based on a first priority for audio data relative to a second priority for control data and on a first audio buffer status;
selecting first control data stored by the first computing device in a first control buffer to transmit to the second computing device based on the second priority for control data relative to the first priority for audio data and on a first control buffer status, wherein the second priority is higher than the first priority, audio data and control data are stored in separate buffers, and the first control buffer is separate from the first audio buffer;
in response to determining that the first computing device possesses a transmit token, performing a transmission process, the transmission process including:
transmitting frames including the selected first audio data and the selected first control data to the second computing device;
waiting a threshold period of time for an acknowledgement message from the second computing device; and
in response to the threshold period of time expiring before receipt of an acknowledgement message from the second computing device and a number of retransmissions of the frames in the transmission process being less than a threshold number, repeating the transmitting of the frames and the waiting for an acknowledgement message from the second computing device; and
transmitting the transmit token from the first computing device to the second computing device after performing the transmission process.

15. The non-transitory computer-readable medium of claim 14, wherein the method comprises:
comparing an amount of data in the first audio buffer to an audio buffer fullness threshold;
comparing an amount of data in the first control buffer to a control buffer fullness threshold; and
selecting an amount of audio data and selecting an amount of control data to transmit based on the comparing of the amount of data in the first audio buffer to the audio buffer fullness threshold and the comparing of the amount of data in the first control buffer to the control buffer fullness threshold.

16. The system of claim 1, wherein the first circuitry is configured to:
compare an amount of data in the first audio buffer to an audio buffer fullness threshold;
compare an amount of data in the first control buffer to a control buffer fullness threshold; and
select an amount of audio data and select an amount of control data to transmit based on the comparing of the amount of data in the first audio buffer to the audio buffer fullness threshold and the comparing of the amount of data in the first control buffer to the control buffer fullness threshold.

17. The method of claim 6, comprising:
comparing an amount of data in the first audio buffer to an audio buffer fullness threshold;
comparing an amount of data in the first control buffer to a control buffer fullness threshold; and
selecting an amount of audio data and selecting an amount of control data to transmit based on the comparing of the amount of data in the first audio buffer to the audio buffer fullness threshold and the comparing of the amount of data in the first control buffer to the control buffer fullness threshold.

18. A computing device, comprising:
a first audio buffer, which, in operation, stores audio data; and
a first control buffer separate from the first audio buffer, wherein the first control buffer, in operation, stores control data;
control circuitry coupled to the first audio buffer and the first control buffer, wherein the control circuitry, in operation:

controls storing of audio data and storing of control data in separate buffers, the storing including storing first audio data in the first audio buffer and storing first control data in the first control buffer;

selects a portion of the first audio data to transmit to a second computing device based on a first priority for audio data relative to a second priority for control data and on a first audio buffer status;

selects a portion of the first control data to transmit to the second computing device based on the second priority for control data relative to the first priority for audio data and on a first control buffer status, wherein the second priority is higher than the first priority;

in response to determining that the computing device possesses a transmit token, performs a transmission process, the transmission process including:
 transmitting frames including the selected first audio data and the selected first control data to the second computing device;
 waiting a threshold period of time for an acknowledgement message from the second computing device; and
 in response to the threshold period of time expiring before receipt of an acknowledgement message from the second computing device and a number of retransmissions of the frames in the transmission process being less than a threshold number, repeating the transmitting of the frames and the waiting for an acknowledgement message from the second computing device; and controls transmitting of the transmit token to the second computing device after the transmission process.

19. The computing device of claim 18, wherein, in operation, the controlling transmitting of the transmit token includes:
 controlling transmitting of the transmit token to the second computing device based on whether an acknowledgement message has been received.

20. The computing device of claim 18, wherein, in operation, the control circuitry controls transmission of a data frame including the selected first audio data and the selected first control data to the second computing device.

21. The computing device of claim 18, wherein the control circuitry, in operation:
 responds to an acknowledge message received during the transmission process from the second computing device indicating that the second computing device successfully received the frames including the selected first audio data and the selected first control data by:
  ending the transmission process; and
  transmitting the transmit token to the second computing device.

22. The computing device of claim 18, wherein the control circuitry, in operation:
 responds to an acknowledge message received from the second computing device during the transmission process indicating that the second computing device unsuccessfully received the frames including the selected first audio data and the selected first control data by restarting the transmission process.

23. The computing device of claim 18, wherein the control circuitry, in operation, after transmission of the transmit token to the second computing device, responds to an acknowledge message received from the second computing device indicating that the second computing device unsuccessfully received the frames including the selected first audio data and the selected first control data by, in response to receiving the transmit token from the second computing device, restarting the transmission process.

* * * * *